US008938026B2

(12) United States Patent
Premakanthan et al.

(10) Patent No.: US 8,938,026 B2
(45) Date of Patent: Jan. 20, 2015

(54) SYSTEM AND METHOD FOR TUNING AN ANTENNA IN A WIRELESS COMMUNICATION DEVICE

(75) Inventors: Pravin Premakanthan, Chandler, AZ (US); Bing Xu, Gilbert, AZ (US); Mark Kirschenmann, Chandler, AZ (US); Amit Bavisi, Gilbert, AZ (US); Daniel Schwartz, Scottsdale, AZ (US); Mahib Rahman, Chandler, AZ (US)

(73) Assignee: Intel IP Corporation, Santa Clara, CA (US)

( * ) Notice: Subject to any disclaimer, the term of this patent is extended or adjusted under 35 U.S.C. 154(b) by 509 days.

(21) Appl. No.: 13/053,966

(22) Filed: Mar. 22, 2011

(65) Prior Publication Data

US 2012/0243579 A1 Sep. 27, 2012

(51) Int. Cl.
*H04L 25/03* (2006.01)
*H04B 1/04* (2006.01)
*H04B 1/52* (2006.01)

(52) U.S. Cl.
CPC ............... *H04B 1/0458* (2013.01); *H04B 1/04* (2013.01); *H04B 1/525* (2013.01)
USPC ........................................................ 375/297

(58) Field of Classification Search
USPC .................................................. 375/295, 297
See application file for complete search history.

(56) References Cited

U.S. PATENT DOCUMENTS

| | | | |
|---|---|---|---|
| 5,629,653 A | 5/1997 | Stimson | ........................ 333/17.3 |
| 6,919,753 B2 | 7/2005 | Wang et al. | |
| 6,993,297 B2 | 1/2006 | Smith, Jr. | |
| 7,257,416 B2 | 8/2007 | Lee et al. | |
| 7,555,276 B2 | 6/2009 | Wilcox | |
| 7,834,813 B2 | 11/2010 | Caimi et al. | |
| 8,406,806 B2 | 3/2013 | Wong | |
| 2004/0009754 A1 | 1/2004 | Smith, Jr. | |
| 2006/0099963 A1 | 5/2006 | Stephens | |

(Continued)

FOREIGN PATENT DOCUMENTS

| | | |
|---|---|---|
| CN | 101038618 A | 9/2007 |
| CN | 101331685 A | 12/2008 |

(Continued)

OTHER PUBLICATIONS

Hindle; "MEMS Tuner Modules Could Solve Handset Reception Problems"; Microwave Journal; www.mwjournal.com ; pp. 4, Jan. 24, 2011.

(Continued)

*Primary Examiner* — Kevin Kim
(74) *Attorney, Agent, or Firm* — Baker Botts L.L.P.

(57) ABSTRACT

In accordance with some embodiments of the present disclosure, a control path for a wireless communication device may include a radio frequency coupler having a coupled port and a terminated port, the radio frequency coupler configured to couple at least a portion of a transmission power of a transmission line coupled to the antenna tuner such that the coupled port carries a first signal indicative of an incident power transmitted to an antenna coupled to the antenna tuner and the terminated port carries a second signal indicative of a reflected power reflected by the antenna. the control path may also include a control module configured to communicate the one or more control signals to the antenna tuner for controlling the impedance of the antenna tuner based at least on the first signal and the second signal.

20 Claims, 3 Drawing Sheets

(56) References Cited

U.S. PATENT DOCUMENTS

| | | |
|---|---|---|
| 2006/0197624 A1* | 9/2006 | Jue .................................. 333/32 |
| 2006/0281423 A1* | 12/2006 | Caimi et al. .................. 455/129 |
| 2007/0026838 A1* | 2/2007 | Staudinger et al. ........... 455/341 |
| 2007/0142014 A1 | 6/2007 | Wilcox |
| 2007/0197180 A1 | 8/2007 | McKinzie, III et al. |
| 2007/0275691 A1 | 11/2007 | Boda |
| 2008/0049868 A1* | 2/2008 | Brobston ...................... 375/297 |
| 2010/0069115 A1 | 3/2010 | Liu |
| 2011/0273164 A1* | 11/2011 | Dupuis ......................... 324/142 |
| 2013/0169348 A1 | 7/2013 | Shi |
| 2013/0183910 A1 | 7/2013 | Bavisi et al. |

FOREIGN PATENT DOCUMENTS

| | | |
|---|---|---|
| CN | 101496222 A | 7/2009 |
| CN | 1669218 B | 9/2010 |
| WO | WO 2004/008634 | 1/2004 |

OTHER PUBLICATIONS

Extended European Search Report; Application No. 12160085.2-1852 / 2503701; pp. 6, Apr. 25, 2013.

Office Action received for Chinese Patent Application No. 2012100835952, mailed on Dec. 23, 2013, 32 pages of Office Action including 21 pages of English Translation.

Non-Final Office Action received for U.S Appl. No. 13/352,083, mailed on Mar. 12, 2014, 8 pages.

Final Office Action received for U.S. Appl. No. 13/352,083, mailed on Aug. 15, 2014, 11 pages.

Office Action received for Chinese Patent Application No. 201210083595.2, mailed on Sep. 9, 2014, 18 pages of English Translation and 11 pages of Chinese Office Action.

* cited by examiner

SYSTEM AND METHOD FOR TUNING AN ANTENNA IN A WIRELESS COMMUNICATION DEVICE

TECHNICAL FIELD

The present disclosure relates generally to wireless communication and, more particularly, to tuning of an antenna in a wireless communication device.

BACKGROUND

Wireless communications systems are used in a variety of telecommunications systems, television, radio and other media systems, data communication networks, and other systems to convey information between remote points using wireless transmitters and wireless receivers. A transmitter is an electronic device which, usually with the aid of an antenna, propagates an electromagnetic signal such as radio, television, or other telecommunications. Transmitters often include digital signal processing circuits which encode a data signal, upconverts it to a radio frequency signal, and passes it signal amplifiers which receive the radio-frequency, amplify the signal by a predetermined gain, and transmit the amplified signal through an antenna. On the other hand, a receiver is an electronic device which, also usually with the aid of an antenna, receives and processes a wireless electromagnetic signal. In certain instances, a transmitter and receiver may be combined into a single device called a transceiver.

Many wireless transceivers, particularly in those integral to handheld wireless devices (e.g., cellular phones) may suffer from over-the-air performance degradation due to what has been termed in the industry as "hand and head effects." Hand and head effects may occur as a result of proximity of a user's head, hand, or other body part to an antenna of the transceiver. The proximity of such body parts to an antenna may cause a change in electrical properties of the antenna, for example changes in the effective load resistance, load capacitance, or load inductance. These changes in electrical characteristics can cause variations in the ratio of incident power to reflected power transmitted to an antenna, which may lead to performance degradation in transmitted signals.

SUMMARY

In accordance with some embodiments of the present disclosure, a control path for a wireless communication device may include a radio frequency coupler having a coupled port and a terminated port, the radio frequency coupler configured to couple at least a portion of a transmission power of a transmission line coupled to the antenna tuner such that the coupled port carries a first signal indicative of an incident power transmitted to an antenna coupled to the antenna tuner and the terminated port carries a second signal indicative of a reflected power reflected by the antenna. the control path may also include a control module configured to communicate the one or more control signals to the antenna tuner for controlling the impedance of the antenna tuner based at least on the first signal and the second signal.

Technical advantages of one or more embodiments of the present disclosure may include a dynamically tuned antenna that may reduce or eliminate degradation to transmission performance due to the head and hand effect, or other undesired effects.

It will be understood that the various embodiments of the present disclosure may include some, all, or none of the enumerated technical advantages. In addition, other technical advantages of the present disclosure may be readily apparent to one skilled in the art from the figures, description and claims included herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
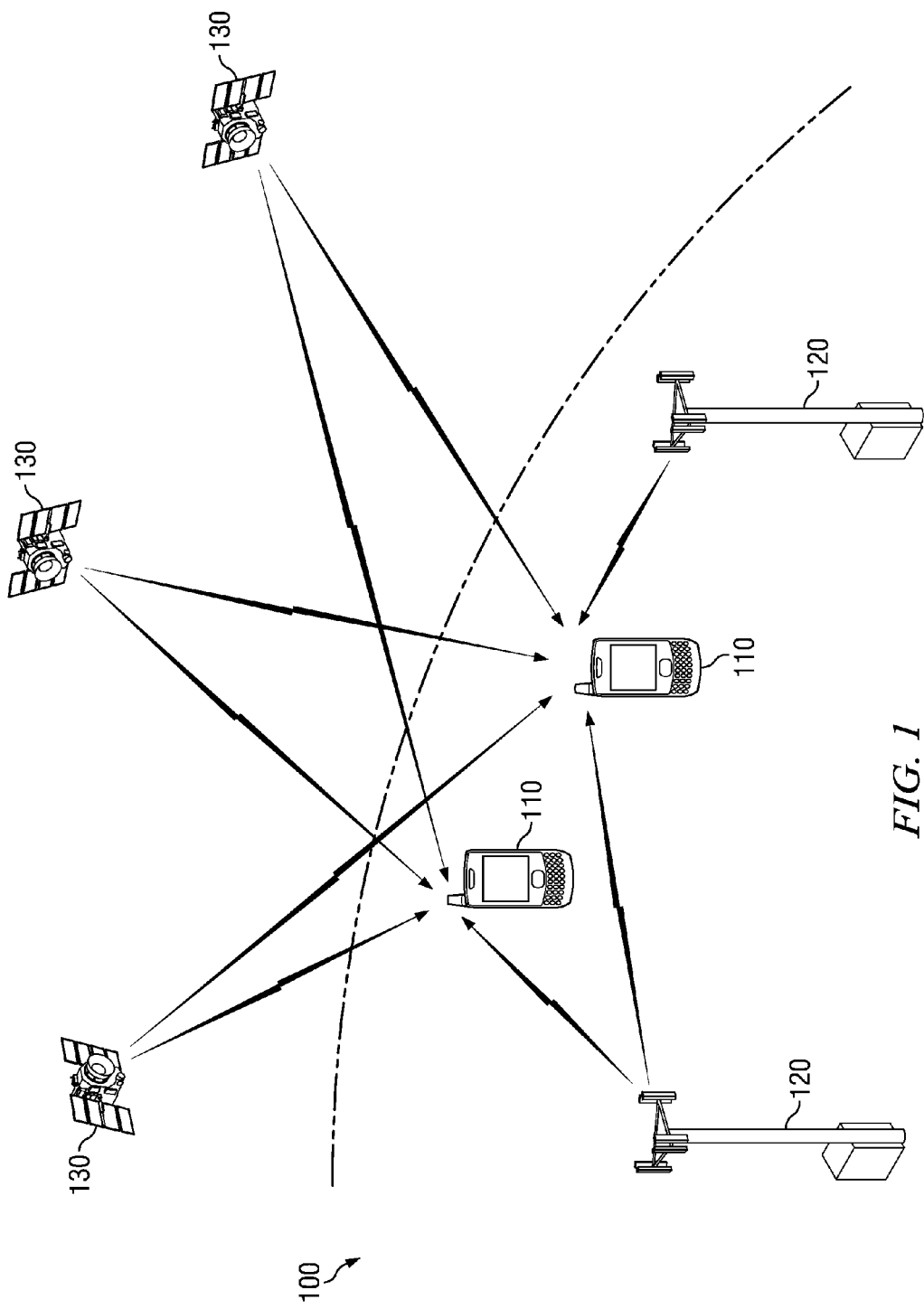
FIG. 1 illustrates a block diagram of an example wireless communication system, in accordance with certain embodiments of the present disclosure.

FIG. 1 illustrates a block diagram of an example wireless communication system 100, in accordance with certain embodiments of the present disclosure. For simplicity, only two terminals 110 and two base stations 120 are shown in FIG. 1. A terminal 110 may also be referred to as a remote station, a mobile station, an access terminal, user equipment (UE), a wireless communication device, a cellular phone, or some other terminology. A base station 120 may be a fixed station and may also be referred to as an access point, a Node B, or some other terminology.

A terminal 110 may or may not be capable of receiving signals from satellites 130. Satellites 130 may belong to a satellite positioning system such as the well-known Global Positioning System (GPS). Each GPS satellite may transmit a GPS signal encoded with information that allows GPS receivers on earth to measure the time of arrival of the GPS signal. Measurements for a sufficient number of GPS satellites may be used to accurately estimate a three-dimensional position of a GPS receiver. A terminal 110 may also be capable of receiving signals from other types of transmitting sources such as a Bluetooth transmitter, a Wireless Fidelity (Wi-Fi) transmitter, a wireless local area network (WLAN) transmitter, an IEEE 802.11 transmitter, and any other suitable transmitter.

In FIG. 1, each terminal 110 is shown as receiving signals from multiple transmitting sources simultaneously, where a transmitting source may be a base station 120 or a satellite 130. In certain embodiments, a terminal 110 may also be a transmitting source. In general, a terminal 110 may receive signals from zero, one, or multiple transmitting sources at any given moment.

System 100 may be a Code Division Multiple Access (CDMA) system, a Time Division Multiple Access (TDMA) system, or some other wireless communication system. A CDMA system may implement one or more CDMA standards such as IS-95, IS-2000 (also commonly known as "1x"), IS-856 (also commonly known as "1xEV-DO"), Wideband-CDMA (W-CDMA), and so on. A TDMA system may implement one or more TDMA standards such as Global System for Mobile Communications (GSM). The W-CDMA standard is defined by a consortium known as 3GPP, and the IS-2000 and IS-856 standards are defined by a consortium known as 3GPP2.

Figure 2:
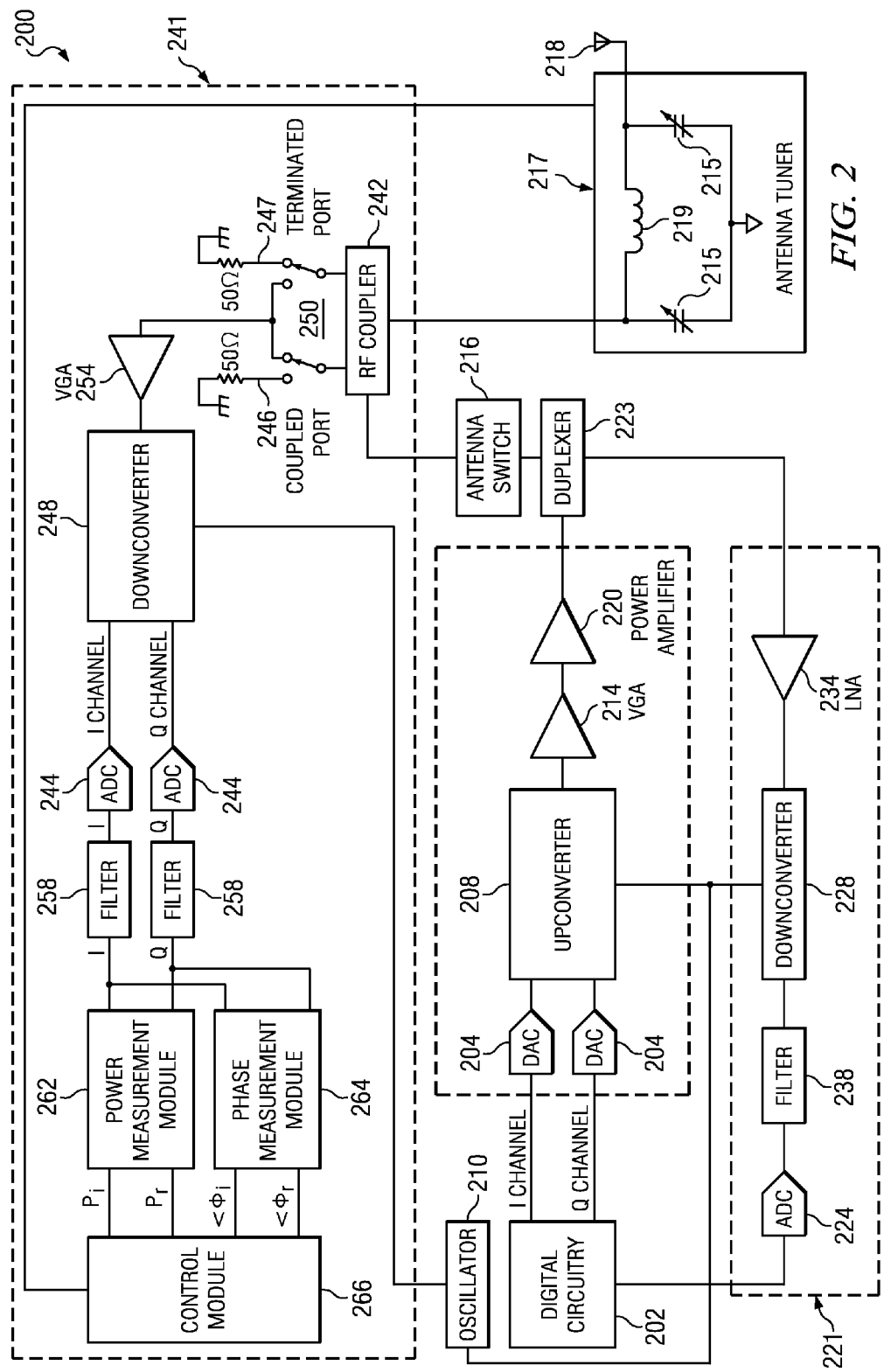
FIG. 2 illustrates a block diagram of selected components of an example transmitting and/or receiving element, in accordance with certain embodiments of the present disclosure.

FIG. 2 illustrates a block diagram of selected components of an example transmitting and/or receiving element 200

(e.g., a terminal 110, a base station 120, or a satellite 130), in accordance with certain embodiments of the present disclosure. Element 200 may include a transmit path 201, a receive path 221, and an antenna tuner control path 241. Depending on the functionality of element 200, element 200 may be considered a transmitter, a receiver, or a transceiver.

As depicted in FIG. 2, element 200 may include digital circuitry 202. Digital circuitry 202 may include any system, device, or apparatus configured to process digital signals and information received via receive path 221, and/or configured to process signals and information for transmission via transmit path 201. Such digital circuitry 202 may include one or more microprocessors, digital signal processors, and/or other suitable devices. As shown in FIG. 2, digital circuitry 202 may communicate in-phase (I) channel and quadrature (Q) channel components of a digital signal to transmit path 201.

Transmit path 201 may include a digital-to-analog converter (DAC) 204 for each of the I channel and Q channel. Each DAC 204 may be configured to receive its respective I or Q channel component of the digital signal from digital circuitry 202 and convert such digital signal into an analog signal. Such analog signal may then be passed to one or more other components of transmit path 201, including upconverter 208.

Upconverter 208 may be configured to frequency upconvert an analog signal received from DAC 204 to a wireless communication signal at a radio frequency based on an oscillator signal provided by oscillator 210. Oscillator 210 may be any suitable device, system, or apparatus configured to produce an analog waveform of a particular frequency for modulation or upconversion of an analog signal to a wireless communication signal, or for demodulation or downconversion of a wireless communication signal to an analog signal. In some embodiments, oscillator 210 may be a digitally-controlled crystal oscillator.

Transmit path 201 may include a variable-gain amplifier (VGA) 214 to amplify an upconverted signal for transmission, and a power amplifier 220 to further amplify the analog upconverted signal for transmission via antenna 218. The output of power amplifier 220 may be communicated to duplexer 223. A duplexer 223 may be interfaced between antenna switch 216 and each transmit path 201 and receive path 221. Accordingly, duplexer 223 may allow bidirectional communication through antenna tuner 217 and antenna 218 (e.g., from transmit path 201 to antenna 218, and from antenna 218 to receive path 221).

Antenna switch 216 may be coupled between duplexer 224 and antenna tuner 217. Antenna switch 216 may configured to multiplex the output of two or more power amplifiers (e.g., similar to power amplifier 220), in which each power amplifier may correspond to a different band or band class. Antenna switch 216 may allow duplexing of signals received by antenna 218 to a plurality of receive paths of different bands or band classes.

An antenna tuner 217 may be coupled between antenna switch 216 and antenna 218. Antenna tuner 217 may include any device, system, or apparatus configured to improve efficiency of power transfer between antenna 218 and transmit path 201 by matching (or attempting to closely match) the impedance of transmit path 201 to antenna 218. Such matching or close matching may reduce the ratio of reflected power to incident power transferred to the antenna from transmit path 201, thus increasing efficiency of power transfer. As shown in FIG. 2, antenna tuner 217 may include one or more variable capacitors 215 and an inductor 219. As discussed in greater detail below, the capacitances of variable capacitors 215 may be varied based on one or more control signals communicated from antenna tuner control path 241. As such capacitances are varied, the effective impedance of the combination of antenna tuner 217 and antenna 218 is varied. Thus, by setting the capacitances appropriately, the effective impedance of the combination of antenna tuner 217 and antenna 218 may be approximately matched to that of the remainder of transmit path 201.

Antenna 218 may receive the amplified signal and transmit such signal (e.g., to one or more of a terminal 110, a base station 120, and/or a satellite 130). As shown in FIG. 2, antenna 218 may be coupled to each of transmit path 201 and receive path 221. Duplexer 223 may be interfaced between antenna 218 and each of receive path and Receive path 221 may include a low-noise amplifier 234 configured to receive a wireless communication signal (e.g., from a terminal 110, a base station 120, and/or a satellite 130) via antenna 218, antenna tuner 217, and duplexer 223. LNA 224 may be further configured to amplify the received signal.

Receive path 221 may also include a downconverter 228. Downconverter 228 may be configured to frequency downconvert a wireless communication signal received via antenna 218 and amplified by LNA 234 by an oscillator signal provided by oscillator 210 (e.g., downconvert to a baseband signal). Receive path 221 may further include a filter 238, which may be configured to filter a downconverted wireless communication signal in order to pass the signal components within a radio-frequency channel of interest and/or to remove noise and undesired signals that may be generated by the downconversion process. In addition, receive path 221 may include an analog-to-digital converter (ADC) 224 configured to receive an analog signal from filter 238 and convert such analog signal into a digital signal. Such digital signal may then be passed to digital circuitry 202 for processing.

Antenna tuner control path 241 may in general be configured to sense signals representative of the incident power transmitted to antenna 218 and reflected power from antenna 218, and based at least on such sensed signals, communicate a control signal to antenna tuner 217 for tuning the impedance of antenna tuner 217 (e.g., tuning variable capacitors 215 to desired capacitances). As shown in FIG. 2, antenna tuner control path 241 may include a radio frequency (RF) coupler 242. RF coupler 242 may be any system, device or apparatus configured to couple at least a portion of the transmission power in the transmission line coupling antenna switch 216 to antenna tuner 217 to one or more output ports. As known in the art, one of the output ports may be known as a coupled port (e.g., coupled port 246 as shown in FIG. 2) while the other output port may be known as a terminated or isolated port (e.g., terminated port 247 as shown in FIG. 2). In many cases, each of coupled port 246 and terminated port 247 may be terminated with an internal or external resistance of a particular resistance value (e.g., 50 ohms). Due to the physical properties of RF coupler 242, during operation of element 200, coupled port 246 may carry an analog signal (e.g., a voltage) indicative of incident power transmitted to antenna 218 while terminated port 247 may carry an analog signal (e.g., a voltage) indicative of power reflected from antenna 218.

Input terminals of a switch 250 may be coupled to coupled port 246 and telininated port 247. At predefined or desired intervals, switch 250 may switch between closing a path between coupled port 246 and the input terminal of variable gain amplifier (VGA) 254 and closing a path between terminated port 247 and the input terminal of VGA 254. VGA 254 may amplify the signals alternatingly communicated via switch 250, and communicate such amplified signals to downconverter 248.

Downconverter 248 may be configured to frequency downconvert the alternating incident power signal and reflected power signal by an oscillator signal provided by oscillator 210 (e.g., downconvert to a baseband signal) and output an in-phase (I) channel and quadrature (Q) channel components of for each of the baseband incident power signal and baseband reflected power signal. In addition, control path 214 may include an analog-to-digital converter (ADC) 244 for each of the I channel and Q channel, each ADC 244 configured to receive the appropriate component of the baseband incident power signal and reflected power signal and convert such components from analog signals into a digital signals.

Control path 241 may also include a filter 258 for each of the I channel and Q channel components of the digital incident power signal and digital reflected power signal. In some embodiments, each filter 258 may comprise a moving-average filter (e.g., a cascaded integrator-comb filter) configured to produce at its output a moving average of signals received at its input. As a result, filters 258 may output I channel and Q channel components of the averaged digital incident power signal and I channel and Q channel components of the averaged digital reflected power signal.

As depicted in FIG. 2, control path 241 may also include a power measurement module 262. Power measurement module 262 may include any system, device, or apparatus configured to, based on the I channel and Q channel components of the averaged digital incident power signal and the I channel and the Q channel components of the averaged digital reflected power signal, calculate and output signals indicative of the magnitude of the incident power $|P_i|$ transmitted to antenna 218 and the magnitude of the reflected power $|P_r|$ reflected from antenna 218. For example, power measurement module 262 may calculate incident power in accordance with the equation $|P_i|=\sqrt{(|P_{iI}|^2+|P_{iQ}|^2)}$ and reflected power in accordance with the equation $|P_r|=\sqrt{(|P_{rI}|^2+|P_{rQ}|^2)}$, where $|P_{iI}|$ is the magnitude of the I channel component of the average digital incident power signal, $|P_{iQ}|$ is the magnitude of the Q channel component of the average digital incident power signal, $|P_{rI}|$ is the magnitude of the I channel component of the average digital reflected power signal, and $|P_{rQ}|$ is the magnitude of the Q channel component of the average digital reflected power signal.

Control path 241 may further include phase measurement module 264. Phase measurement module 264 may include any system, device, or apparatus configured to, based on the I channel and Q channel components of the averaged digital incident power signal and the I channel and the Q channel components of the averaged digital reflected power signal, calculate and output signals indicative of the phase $\phi_i$ of the incident power transmitted to antenna 218 and the phase $\phi_r$ of the reflected power reflected from antenna 218. For example, phase measurement module 264 may calculate incident power phase in accordance with the equation $\phi_i=\tan^{-1}(P_{iQ}/P_{iI})$ and reflected power phase in accordance with the equation $\phi_i=\tan^{-1}(P_{rQ}/P_{rI})$ where $P_{iI}$ is the I channel component of the average digital incident power signal, $P_{iQ}$ is the Q channel component of the average digital incident power signal, $P_{rI}$ is the I channel component of the average digital reflected power signal, and $P_{rQ}$ is the Q channel component of the average digital reflected power signal.

Control path 241 may additionally include a control module 266 configured to receive signals indicative of the incident power $|P_i|$, the magnitude of the reflected power $|P_r|$, the phase go, of the incident power, and the phase $\phi_r$ of the reflected power, and based at least on such received signals, output one or more control signals to antenna tuner 217 to control the impedance of antenna tuner 217 (e.g., by controlling the capacitances of variable capacitors 215). For example, to reduce reflected power relative to incident power (and thus improve power transmission), control module 266 may communicate control signals to antenna tuner 217 in order control the effective impedance of antenna tuner 217 such that the ratio of reflected power to incident power is minimized. As a specific example, the complex reflection coefficient for antenna 218 may be given by the equation $\Gamma=A+jB=V_r\angle\varphi_r/V_i\angle\phi_i$, where A and B are the real and imaginary components of the complex reflection coefficient, and $V_r$ and $V_i$ are the reflected voltage and incident voltage. The reflection coefficient describes the return loss and, as shown above, may be given as the ratio between the reflected and incident power. The voltage standing wave ratio (VSWR) may be given as $(1+|\Gamma|)/(1-|\Gamma|)$. Given that $\Gamma=(Z_L-Z_0)/(Z_L+Z_0)$, where $Z_L$ is the present complex impedance of the antenna tuner and $Z_0$ represents known characteristic impedance of the transmission line coupled to antenna 218 (e.g., often equal to 50 ohms for many applications), control module 266 may solve for the impedance $Z_L$, and modify such impedance accordingly to reduce the complex reflection coefficient $\Gamma$. To further illustrate, the magnitude of the reflection coefficient may be given by $|\Gamma|=\sqrt{(|P_r|/|P_i|)}$ and the percentage of power delivered to antenna load $Z_L$ may be given as $1-|\Gamma|^2$.

Thus, to reduce reflected power relative to incident power (and thus improve power transmission), control module 266 may communicate control signals to antenna tuner 217 in order to reduce the complex reflection coefficient $\Gamma$.

Portions of control path 241 (e.g., filters 258, power measurement module 262, phase measurement module 264, and/or control module 266) may be implemented as one or more microprocessors, digital signal processors, and/or other suitable devices.

Figure 3:
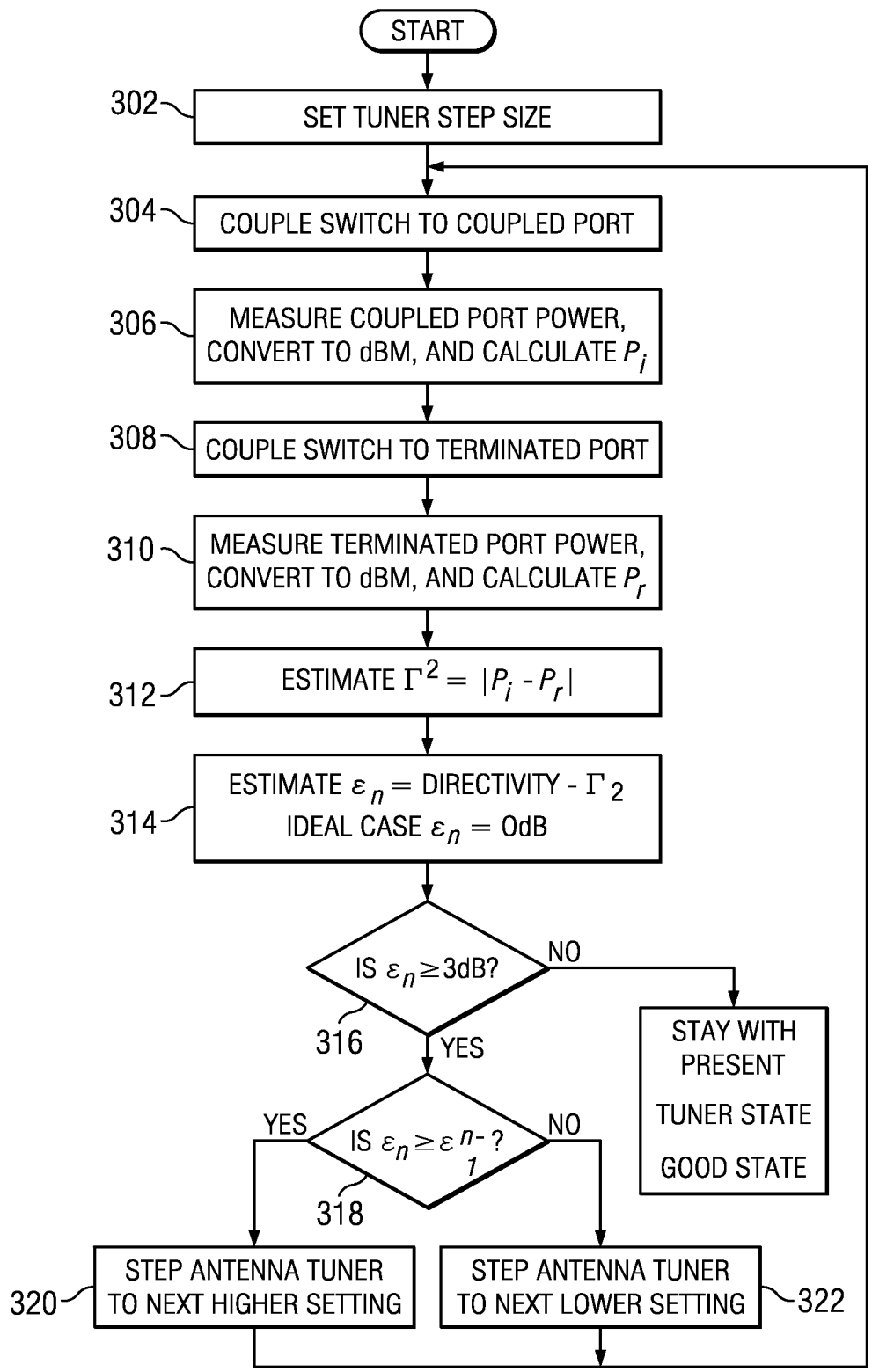
FIG. 3 illustrates a flow chart of an example method for controlling an antenna tuner, in accordance with certain embodiments of the present disclosure.

FIG. 3 illustrates a flow chart of an example method 300 for controlling an antenna tuner, in accordance with certain embodiments of the present disclosure. According to one embodiment, method 300 preferably begins at step 302. As noted above, teachings of the present disclosure may be implemented in a variety of configurations of system 100. As such, the preferred initialization point for method 300 and the order of the steps 302-322 comprising method 300 may depend on the implementation chosen.

At step 302, control path 241 may set a tuner step size for antenna tuner 217 (e.g., based on the minimum amount of change in capacitance available by varying capacitance of varactors 215).

At step 304, switch 250 may switch to couple coupled port 246 to other elements of control path 241. At step 306, power management module 262, phase management module 264, and/or other components of control path 241 may sense a signal indicative of the coupled port power, convert the measurement to decibels referenced to one milliwatt (dBm), and calculate incident power $P_i$ (e.g., as described above in reference to FIG. 2).

At step 308, switch 250 may switch to couple terminated port 247 to other elements of control path 241. At step 310, power management module 262, phase management module 264, and/or other components of control path 241 may sense a signal indicative of the terminated port power, convert the measurement to decibels referenced to one milliwatt (dBm), and calculate reflected power $P_r$ (e.g., as described above in reference to FIG. 2).

At step 312, control module 266 may estimate the square of the reflection coefficient $\Gamma^2$ (e.g., by control module 266)

based on the calculated incident power $P_i$ and calculated reflected power $P_r$ (e.g., $\Gamma^2=|P_i-P_r|$, after all quantities have been converted into dBm).

At step 314, control module 266 may estimate $\epsilon_n$=Directivity-$\Gamma^2$, where directivity is an ideal ratio of incident and reflected power, which may be a characteristic of RF coupler 242 that measures the coupler's effectiveness in isolating two opposite-traveling (incident and reflected) signals. In a system with no transmission line mismatch, Directivity=$\Gamma^2$. Accordingly, $\epsilon_n$ may represent an error value indicative of a estimated return loss of an for an antenna load, where n corresponds to a current step setting of an antenna tuner 217.

At step 316, control module 266 may determine whether $\epsilon_n$ is greater or equal to a particular threshold (e.g., 3 decibels). If $\epsilon_n$ is greater or equal to the particular threshold, method 300 may proceed to step 318. Otherwise, method 300 may return to step 304.

At step 318, in response to a determination that $\epsilon_n$ is greater or equal to the particular threshold, control module 266 may determine if $\epsilon_n$ is greater or equal to $\epsilon_{n-1}$ where n-1 corresponds to the next lower step setting of antenna tuner 217. If $\epsilon_n$ is greater or equal to $\epsilon_{n-1}$, method 300 may proceed to step 320. Otherwise, method 300 may proceed to step 322.

At step 320, in response to a determination that $\epsilon_n$ is greater or equal to $\epsilon_{n-1}$, control module 266 may communicate control signals to antenna tuner 217 such that antenna tuner 217 is stepped to its next higher setting (e.g., capacitances of varactors 215 increases by the smallest amount possible). After completion of step 320, method 300 may proceed again to step 304.

At step 322, in response to a determination that $\epsilon_n$ is not greater or equal to $\epsilon_{n-1}$, control module 266 may communicate control signals to antenna tuner 217 such that antenna tuner 217 is stepped to its next lower setting (e.g., capacitances of varactors 215 decreases by the smallest amount possible). After completion of step 322, method 300 may proceed again to step 304.

Although FIG. 3 discloses a particular number of steps to be taken with respect to method 300, it is understood that method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using system 100 or any other system operable to implement method 300. In certain embodiments, method 300 may be implemented partially or fully in software embodied in computer-readable media.

Modifications, additions, or omissions may be made to system 100 from the scope of the disclosure. The components of system 100 may be integrated or separated. Moreover, the operations of system 100 may be performed by more, fewer, or other components. As used in this document, "each" refers to each member of a set or each member of a subset of a set.

Although the present disclosure has been described with several embodiments, various changes and modifications may be suggested to one skilled in the art. It is intended that the present disclosure encompass such changes and modifications as fall within the scope of the appended claims.

What is claimed is:

1. A wireless communication element, comprising:
    a receive path configured to receive a first wireless communication signal and convert the first wireless communication signal into a first digital signal based at least on an oscillator signal;
    a transmit path configured to convert a second digital signal into a second wireless communication signal based at least on the oscillator signal;
    an antenna coupled to the receive path and the transmit path and configured to transmit the second wireless communication signal;
    an antenna tuner coupled to the transmit path and the antenna; and
    a control path coupled to the antenna and the antenna tuner, the control path configured to:
        sense a power transmitted from the transmit path to the antenna;
        sense a phase of the power transmitted from the transmit path to the antenna; and
        based at least on the sensed power and the send phase, communicate one or more control signals to the antenna tuner for controlling an impedance of the antenna tuner.

2. A wireless communication element according to claim 1, the antenna tuner comprising one or more variable capacitors, the one or more control signals to the antenna tuner for controlling the capacitances of the one or more variable capacitors.

3. A wireless communication element according to claim 1, the control path comprising a radio frequency coupler having a coupled port and a terminated port, the radio frequency coupler configured to couple at least a portion of the transmission power of the second wireless communication signal to the coupled port and the terminated port.

4. A wireless communication element according to claim 3, wherein the coupled port carries a first signal indicative of an incident power transmitted to the antenna and the terminated port carries a second signal indicative of a reflected power reflected by the antenna, and the control path is configured to communicate the one or more control signals to the antenna tuner for controlling the impedance of the antenna tuner based at least on the first signal and the second signal.

5. A wireless communication element according to claim 4, the control path further configured to:
    downconvert the first signal to a baseband incident power signal having an in-phase channel component and a quadrature channel component;
    downconvert the second signal to a baseband reflected power signal having an in-phase channel component and a quadrature channel component; and
    communicate the one or more control signals to the antenna tuner for controlling the impedance of the antenna tuner based on at least on the baseband incident power signal and the baseband reflected power signal.

6. A wireless communication element according to claim 5, the control path further configured to:
    convert the baseband incident power signal into a digital incident power signal having an in-phase channel component and a quadrature channel component;
    convert the baseband reflected power signal into a digital reflected power signal having an in-phase channel component and a quadrature channel component; and
    communicate the one or more control signals to the antenna tuner for controlling the impedance of the antenna tuner based on at least on the digital incident power signal and the digital reflected power signal.

7. A wireless communication element according to claim 6, the control path further configured to:
    filter the digital incident power signal to produce an averaged digital incident power signal having an in-phase channel component and a quadrature channel component;

filter the digital reflected power signal to produce an averaged digital reflected power signal having an in-phase channel component and a quadrature channel component; and communicate the one or more control signals to the antenna tuner for controlling the impedance of the antenna tuner based on at least on the averaged digital incident power signal and the averaged digital reflected power signal.

8. A wireless communication element according to claim 7, the control path further configured to:
calculate an incident power based at least on the in-phase channel component and the quadrature channel component of the averaged digital incident power signal;
calculate a reflected power based at least on the in-phase channel component and the quadrature channel component of the averaged digital reflected power signal; and
communicate the one or more control signals to the antenna tuner for controlling the impedance of the antenna tuner based on at least on the incident power and the reflected power.

9. A wireless communication element according to claim 7, the control path further configured to:
calculate an incident power phase based at least on the in-phase channel component and the quadrature channel component of the averaged digital incident power signal;
calculate a reflected power phase based at least on the in-phase channel component and the quadrature channel component of the averaged digital reflected power signal; and
communicate the one or more control signals to the antenna tuner for controlling the impedance of the antenna tuner based on at least on the incident power phase and the reflected power phase.

10. A control path for control of an antenna tuner, comprising:
a radio frequency coupler having a coupled port and a terminated port, the radio frequency coupler configured to couple at least a portion of a transmission power of a transmission line such that the coupled port carries a first signal indicative of an incident power transmitted to an antenna and the terminated port carries a second signal indicative of a reflected power reflected by the antenna;
an antenna tuner coupled between the transmission line and the antenna; and
a control module configured to communicate the one or more control signals to the antenna tuner for controlling an impedance of the antenna tuner based at least on the incident power, a phase of the incident power, the reflected power, and a phase of the reflected power.

11. A control path according to claim 10, further comprising:
a downconverter configured to:
downconvert the first signal to a baseband incident power signal having an in-phase channel component and a quadrature channel component; and
downconvert the second signal to a baseband reflected power signal having an in-phase channel component and a quadrature channel component; and
the control module configured to communicate the one or more control signals to the antenna tuner for controlling the impedance of the antenna tuner based on at least on the baseband incident power signal and the baseband reflected power signal.

12. A control path according to claim 11, further comprising:
one or more analog-to-digital converters configured to:
convert the baseband incident power signal into a digital incident power signal having an in-phase channel component and a quadrature channel component; and
convert the baseband reflected power signal into a digital reflected power signal having an in-phase channel component and a quadrature channel component; and
the control module configured to communicate the one or more control signals to the antenna tuner for controlling the impedance of the antenna tuner based on at least on the digital incident power signal and the digital reflected power signal.

13. A control path according to claim 12, further comprising:
one or more filters configured to:
filter the digital incident power signal to produce an averaged digital incident power signal having an in-phase channel component and a quadrature channel component;
filter the digital reflected power signal to produce an averaged digital reflected power signal having an in-phase channel component and a quadrature channel component; and
the control module configured to communicate the one or more control signals to the antenna tuner for controlling the impedance of the antenna tuner based on at least on the averaged digital incident power signal and the averaged digital reflected power signal.

14. A control path according to claim 13, further comprising:
a power measurement module configured to:
calculate an incident power based at least on the in-phase channel component and the quadrature channel component of the averaged digital incident power signal;
calculate a reflected power based at least on the in-phase channel component and the quadrature channel component of the averaged digital reflected power signal; and
the control module configured to communicate the one or more control signals to the antenna tuner for controlling the impedance of the antenna tuner based on at least on the incident power and the reflected power.

15. A control path according to claim 13, further comprising:
a phase measurement module configured to:
calculate an incident power phase based at least on the in-phase channel component and the quadrature channel component of the averaged digital incident power signal;
calculate a reflected power phase based at least on the in-phase channel component and the quadrature channel component of the averaged digital reflected power signal; and
the control module configured to communicate the one or more control signals to the antenna tuner for controlling the impedance of the antenna tuner based on at least on the incident power phase and the reflected power phase.

16. A method, comprising:
coupling a radio frequency coupler to a transmission line such that a coupled port of the radio frequency coupler carries a first signal indicative of an incident power transmitted to an antenna and a terminated port of the radio frequency coupler carries a second signal indicative of a reflected power reflected by the antenna; and communicating the one or more control signals to an antenna tuner coupled between the transmission line and the antenna;

controlling an impedance of the antenna tuner based at least on the incident power, a phase of the incident power, the reflected power, and a phase of the reflected power.

17. A method according to claim 16, further comprising:

downconverting the first signal to a baseband incident power signal having an in-phase channel component and a quadrature channel component;

downconverting the second signal to a baseband reflected power signal having an in-phase channel component and a quadrature channel component; and communicating the one or more control signals to the antenna tuner for controlling the impedance of the antenna tuner based on at least on the baseband incident power signal and the baseband reflected power signal.

18. A method according to claim 17, further comprising:

converting the baseband incident power signal into a digital incident power signal having an in-phase channel component and a quadrature channel component;

converting the baseband reflected power signal into a digital reflected power signal having an in-phase channel component and a quadrature channel component; and communicating the one or more control signals to the antenna tuner for controlling the impedance of the antenna tuner based on at least on the digital incident power signal and the digital reflected power signal.

19. A method according to claim 16, further comprising:

calculating an incident power based at least on the in-phase channel component and the quadrature channel component of the averaged digital incident power signal;

calculating a reflected power based at least on the in-phase channel component and the quadrature channel component of the averaged digital reflected power signal; and communicating the one or more control signals to the antenna tuner for controlling the impedance of the antenna tuner based on at least on the incident power and the reflected power.

20. A method according to claim 16, further comprising:

calculating an incident power phase based at least on the in-phase channel component and the quadrature channel component of the averaged digital incident power signal;

calculating a reflected power phase based at least on the in-phase channel component and the quadrature channel component of the averaged digital reflected power signal; and communicating the one or more control signals to the antenna tuner for controlling the impedance of the antenna tuner based on at least on the incident power phase and the reflected power phase.

\* \* \* \* \*